United States Patent [19]

Tuenge et al.

[11] Patent Number: 4,900,584
[45] Date of Patent: Feb. 13, 1990

[54] RAPID THERMAL ANNEALING OF TFEL PANELS

[75] Inventors: Richard T. Tuenge, Hillsboro; Richard E. Coovert, Portland, both of Oreg.

[73] Assignee: Planar Systems, Inc., Beaverton, Oreg.

[21] Appl. No.: 249,782

[22] Filed: Sep. 27, 1988

Related U.S. Application Data

[63] Continuation-in-part of Ser. No. 2,565, Jan. 12, 1987, abandoned.

[51] Int. Cl.[4] .......................... B05D 5/06; B05D 5/12
[52] U.S. Cl. ......................................... 427/66; 427/64; 313/503
[58] Field of Search ....................... 204/192.15, 192.22, 204/192.26, 192.27, 192.28, 192.29; 313/503, 509; 427/53.1, 54.1, 64, 66, 157

[56] References Cited

U.S. PATENT DOCUMENTS

| | | | |
|---|---|---|---|
| 3,637,410 | 1/1972 | Stevens | 427/53.1 |
| 3,854,070 | 12/1974 | Vlasenko et al. | 313/509 X |
| 4,099,091 | 7/1978 | Yamazoe et al. | 313/509 |
| 4,155,030 | 5/1979 | Chang | 313/463 X |
| 4,442,136 | 4/1984 | Johnson | 427/53.1 |
| 4,508,610 | 4/1985 | Freeman et al. | 204/192.15 X |
| 4,552,782 | 11/1985 | Cattell et al. | 204/192.15 X |

OTHER PUBLICATIONS

Heat Pulse TM 410/610, AG Associates.
H. Venghans et al., "Microstructure . . . Devices", J. Appl. Physics, vol. 53, No. 6, 6/82, pp. 4146–4157.

Primary Examiner—Nam X. Nguyen
Attorney, Agent, or Firm—Chernoff, Vilhauer, McClung & Stenzel

[57] ABSTRACT

A process for fabrication and annealing of TFEL panels includes the steps of depositing a laminar stack of thin films on a glass substrate containing a first set of electrodes, the laminar stack comprising at least one insulating layer and an EL phosphor layer and annealing the laminar stack under an array of high intensity flash lamps at a temperature exceeding 450° C. for a period of between 15 and 240 seconds. The flash lamps bring the temperature of the laminar stack to the required high temperature very quickly and the stack is cooled very quickly at the end of the annealing period. This process conditions the EL phosphor layer but does not warp the glass substrate or damage the thin films.

9 Claims, 3 Drawing Sheets

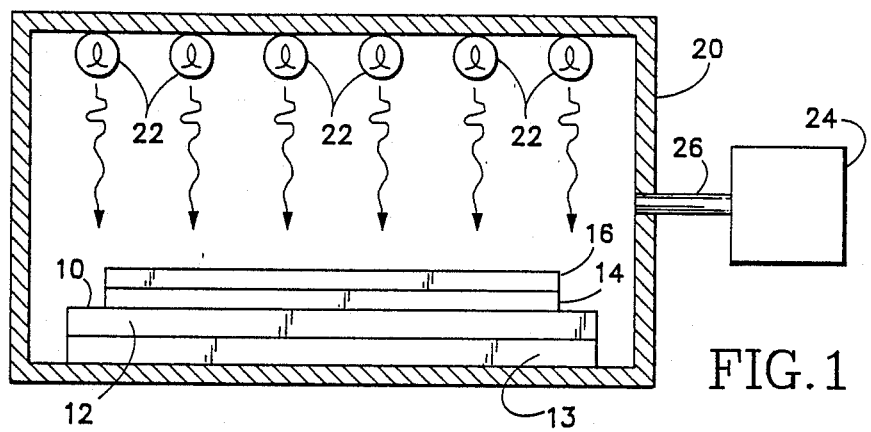
FIG.1
FIG.1a
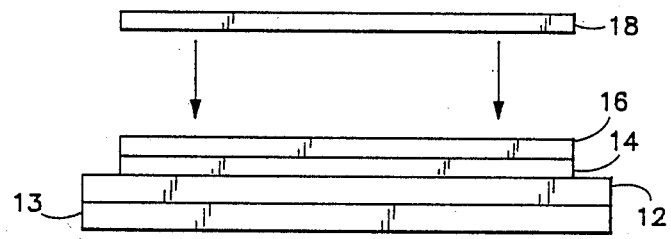
| SAMPLE # | TEMP. (C) | TIME (SEC) | BRIGHTNESS (FL) | EFFICIENCY (1/W) | THRESHOLD VOLTAGE |
|---|---|---|---|---|---|
| 31 | 600 | 60 | 490 | 1.45 | 188 |
| 32 | 650 | 60 | 517 | 1.5 | 184 |
| 30 | 660 | 60 | BROKEN | | |
| 27 | 600 | 120 | 510 | 1.4 | 193 |
| 28 | 650 | 120 | 560 | 1.9 | 185 |
| 29 | 700 | 60 | 531 | 1.6 | 186 |
FIG.2

A. STANDARD SiON/ZnS:Mn/SiON PROCESS

| PANEL # | RTA TEMP (C) | SOAK TIME (S) | Vth (V) | BRIGHTNESS (fL) | INCREASE (%) |
|---|---|---|---|---|---|
| 2 | 600 | 120 | 174 | 30.7 | 39 |
| 3 | 600 | 50 | 176 | 27.0 | 23 |
| 4 | 650 | 60 | 175 | 31.4 | 43 |
| 6 | 650 | 120 | 175 | 33.5 | 52 |
| 7 | 650 | 50 | 176 | 30.0 | 36 |
| 8 | 650 | 240 | 178 | 38.5 | 75 |
| 9 | 700 | 120 | 177 | 30.0 | 36 |
| 11 (CONTROL) | 460 | 1 Hr | 171 | 22.0 | — |

B. HIGH-BRIGHT SiON/ZnS:Mn/SiON PROCESS

| PANEL # | RTA TEMP (C) | SOAK TIME (S) | Vth (V) | BRIGHTNESS (fL) | INCREASE (%) |
|---|---|---|---|---|---|
| 8 | 650 | 240 | 175 | 60.5 | 26 |
| 17 | 650 | 240 | 174 | 65.8 | 38 |
| 19 | 650 | 180 | 178 | 67.0 | 40 |
| 65-5 | 650 | 180 | 174 | 61.5 | 29 |
| 65-12 | 650 | 180 | 176 | 62.1 | 30 |
| 7 (CONTROL) | 640 | 1 Hr | 175 | 47.8 | — |

RAPID THERMAL ANNEALING OF TFEL PANELS

This application is a continuation-in-part of copending patent application Ser. No. 002,565, now abandoned.

BACKGROUND OF THE INVENTION

The following invention relates to an annealing process for light-emitting phosphor material deposited upon a glass substrate for use in thin-film electroluminescent (TFEL) panels.

TFEL panels are flat panel displays which are constructed using a thin layer of electroluminescent (EL) material sandwiched between a pair of insulators, and deposited on a glass substrate forming the face of the panel. The thin-film EL material is excited by an electric field which is supplied by arrays of electrode pairs which sandwich the thin films.

In depositing the EL layer on the glass substrate, it has been known that a heat treatment or annealing step is necessary in order to condition the EL material for optimum light emission. In the past, the annealing has been performed in an oven heated to approximately 450° C. for two hours or more. This creates a bottleneck in the process of manufacturing TFEL panels because of the amount of time required for annealing each panel.

It is well known that light-emitting phosphors are brighter and more efficient if annealed at higher temperatures; however, raising the temperature of the oven has led, in the past, to the warping or cracking of the glass substrate. Moreover, with multicolor displays, using multiple stacked layers or patterned layers of EL material, the problem is aggravated because some EL materials require even higher temperatures to condition the material for greater efficiency. With higher temperature, however, comes the risk of damage to other thin-film layers whose temperature requirements are not as high. Multicolor TFEL displays are shown in copending patent application Ser. No. 727,663, entitled "Multi-Colored Thin-Film Electroluminescent Display" and Ser. No. 844,614, "TFEL Panel Having Multiple Colored Display," both of which are assigned to the same assignee and both of which are incorporated herein by reference.

Another important aspect of the manufacture of TFEL displays is the ease with which such displays can be mass produced. The conventional method of depositing thin-film EL layers is by evaporation which is time consuming and costly. Sputtering is a much more efficient deposition method, but there may be ion damage to the lattice and the grain size of the EL material deposited trough sputtering is usually too small. If the grain size could be made larger, sputtering would be the preferable method of depositing EL layers. The growth of grain size of sputtered EL layers, however, can be accomplished only with the high-temperature, long-time annealing process described above.

Other approaches have included laser annealing, as shown in Johnson, U.S. Pat. No. 4,442,136. With laser annealing, the glass substrate is not warped; however, because of the intense thermal gradient near the boundaries of the laser path, the temperature becomes nonuniform and structural damage may occur to the thin-film layers. This may take the form of delamination of the top insulator layer or the formation of blisters. Moreover, long scan times are required due to the small area covered by the spot size of the laser beam.

Cattell, et al. U.S. Pat. No. 4,552,782 discloses an experimental process for annealing a portion of a DC EL display by heating the substrate to a temperature of greater than 450° C. and then cooling it at a rate of 10° to 20° C. per minute. The problem with this process is that, given the rate of heating and cooling, it is clear that the substrate is brought to the target temperature and then cooled relatively slowly to avoid thermal shock. This leads to problems with glass warpage because the temperature remains too high for too long causing internal stress to the glass.

Vlasenko, U.S. Pat. No. 3,854,070, mentions annealing a panel twice at 600° C. to 700° C. for 5 to 15 minutes each time. How these temperatures are achieved is not specified in the patent. However, the conventional method has been to use an oven with heating elements that heat slowly by both convection and radiation. It takes time to reach these temperatures, and therefore, given the rate of achieving the target temperature in a conventional oven, the glass stays at too high a temperature for too long. At this length of time the panel is likely to warp.

What is needed, therefore, is a process for annealing the thin-film layers of a TFEL screen at a high temperature without warping the glass substrate or structurally damaging the thin-film layers.

SUMMARY OF THE INVENTION

The present invention provides a process for forming a TFEL panel and for annealing the TFEL panel at high temperature without damage to the substrate or thin-film layers.

The process of the invention comprises depositing an insulating layer on a glass substrate supporting a set of electrodes, depositing a phosphor layer on top of the insulating layer, and annealing the thin-film layers by placing the substrate under an array of high intensity lamps or other heating means which radiantly heat the thin-film layers to a temperature greater than 550° C. for a period of from 15 to 240 seconds.

Tungsten-halogen lamps, DC arc lamps, or graphite strip heaters may be used for this purpose, and the process may take place in an enclosed area which may be flooded with nitrogen or some other gas. The thin-film layers are placed directly underneath the lamp array so that radiation is incident on the film side of the glass substrate. The glass substrate rests on a support which has a high coefficient of absorption in the peak portion of the spectral range of the lamps. The support absorbs and re-radiates heat on the bottom side of the substrate which quickly brings it to the target temperature. The thin films and the substrate are rapidly brought to the target temperature, which will exceed 550° C., at rates greater than 20° C. per second, and the target temperature is maintained for 15 to 240 seconds. The films and the substrate are then cooled at substantially the same rate. At this rate the thin films and the substrate are heated quickly and the substrate does not have time to warp. The best results are obtained at 600° to 700° C. at an annealing time of 60 to 180 seconds.

The phosphor material may be deposited on the insulating layer by sputtering, which is faster and more economical than evaporation. Rapid thermal annealing promotes grain growth and repairs ion damage to the lattice occasioned by the sputtering process. Phosphors used in this process may include zinc sulfide activated with manganese, and alkaline earth sulfides activated with rare earths as well as others.

With rapid thermal annealing the interdiffusion of various layers of material is minimized. Some layers are typically less than one micron thick and diffusion between layers can be a serious problem especially where one of the layers includes an oxide. The annealing process of the invention takes only a short time, which is too short for a significant amount of diffusion to take place.

It is a principal object of the invention to provide a process for the deposition and annealing of EL material on a glass substrate utilizing temperatures high enough to yield improved efficiency and brightness without warping the glass substrate or damaging the thin-film laminate.

A further object of this invention is to provide a rapid thermal annealing process for TFEL panels which may be accomplished quickly, utilizing flash lamps for rapid radiant heating of EL phosphors.

A still further object of this invention is to provide a method of annealing multicolor TFEL screens for maximum phosphor efficiency without damage to the thin phosphor layers or to patterned phosphors.

Yet another object of the invention is to enable a manufacturer of TFEL screens to utilize a sputtering technique for depositing EL layers.

A still further object of the invention is to anneal quickly to prevent diffusion among layers during the annealing process.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a schematic representation of the annealing process of the present invention.

FIG. 1a is a schematic representation of an annealed TFEL screen receiving a second insulating layer.

FIG. 2 is a table showing the results of tests conducted using the process of the present invention.

DETAILED DESCRIPTION OF THE INVENTION

Figure 3:
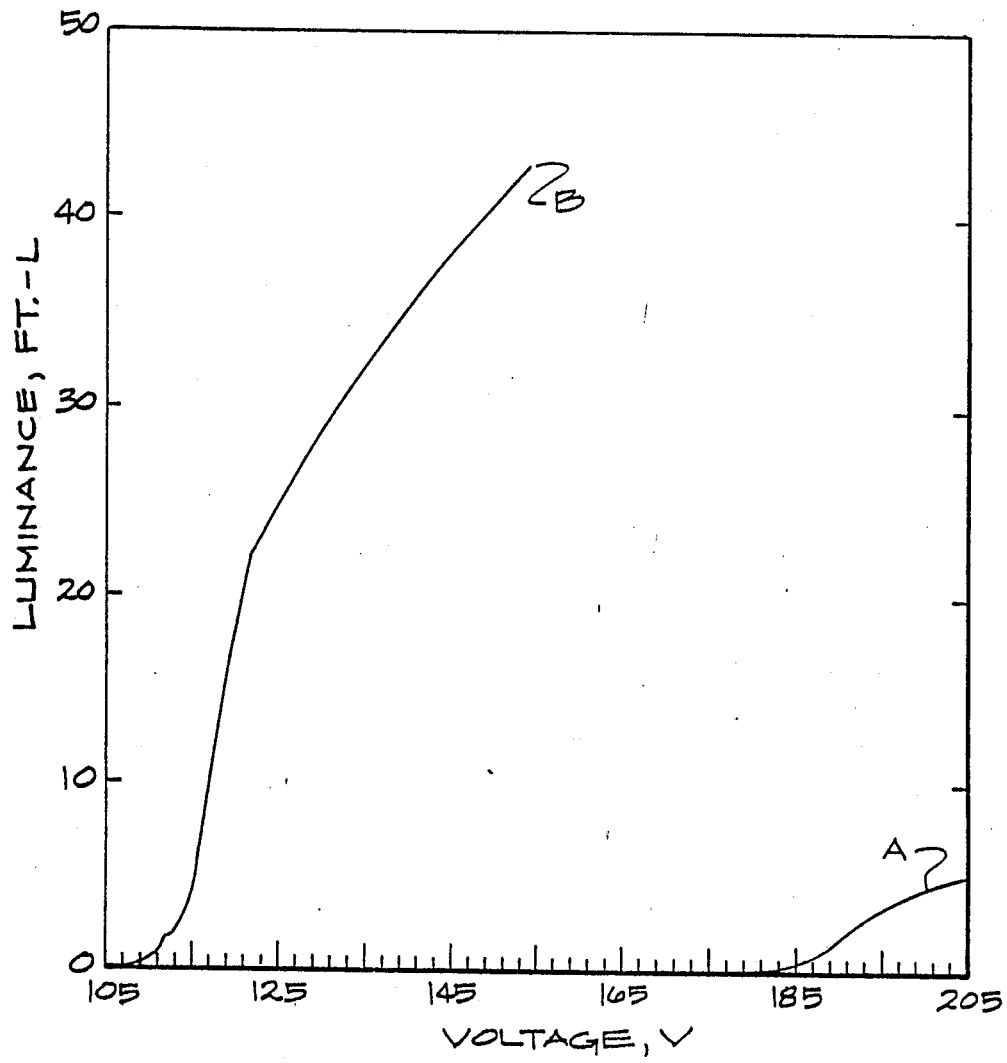
FIG. 3 is a chart showing luminance versus voltage curves of $SrS:CeF_3$ annealed according to both the process of the present invention and using conventional processes, omitting the anneal step.

A TFEL panel 10 includes a glass substrate 12 which is normally the front viewing panel of a TFEL display and which contains a first set of transparent electrodes (not shown). A laminar stack of thin-films is deposited on the glass substrate. This laminar stack includes an insulating layer 14, and a phosphor layer 16 constructed of electroluminescent material. The phosphor layer 16 may be deposited on the insulating layer 14 by evaporation, sputtering or chemical vapor deposition.

The TFEL panel thus partially formed is placed on a support 13 inside an enclosure 20 which includes an array of high intensity flash lamps 22 which are capable of radiantly heating the entire surface area of the TFEL panel 10 at the same time. The support 13 has a high coefficient of energy absorption at the peak wavelength in the energy spectrum of the lamps 22. Thus, the support 13 absorbs heat and in turn heats the substrate 12 with which it is in contact.

The enclosure 20 may be vacuum tight and may be flooded with an inert gas such as nitrogen or argon during the annealing process. The nitrogen is provided by a nitrogen source 24 through a conduit 26. Certain commercially available machines are capable of annealing the thin-film stack, an example of which is a Heatpulse TM 410/610 manufactured by AG Associates of Sunnyvale, Calif.

After the TFEL panel 10 has been partially formed by depositing the insulating layer 14 onto the glass substrate 12 and the EL layer 16 onto the insulating layer 14, the panel 10 is placed in enclosure 20 and the lamp array 22 is turned on until the thin films and the glass substrate 12 are heated at a rate of between 20° and 220° C. per second to a target temperature which exceeds 550° C. Ideally, the temperature should be in the range between 600° and 700° C., and 650° C. has been found to be the optimum temperature for ZnS phosphors. This temperature is maintained for a period of from 15 to 240 seconds and then the films are cooled very quickly at a rate of from 10° to 80° C. per second. A target temperature maintenance period of 60–180 seconds has been found to be optimum. These high rates of both heating and cooling are made possible in part by the heating and cooling action of the support 13 which quickly absorbs energy from the lamp array 22 and which dissipates heat when the array is turned off. After annealing, a second insulating layer 18 is placed over the phosphor layer 16.

With some phosphors, notably those employing fluoride as a coactivator, it is desirable to perform the annealing step prior to depositing the second insulating layer. This allows the fluoride to evaporate during the annealing step which makes the phosphor more efficient. With other phosphors, however, the second insulating layer 18 may optionally be placed over the phosphor layer prior to the annealing step.

The results of a number of test samples annealed according to the process described above is shown in the chart of FIG. 2. The samples were all heated at temperatures between 600° and 700° C. for either 60 or 120 seconds. As the chart shows, the best results in terms of increased brightness and efficiency were shown for the sample no. 28 heated at a temperature of 650° C. for 120 seconds. At temperatures above 600° C., the brightness attained ranged from 490 foot lamberts to 560 foot lamberts.

Figures 4, 5:
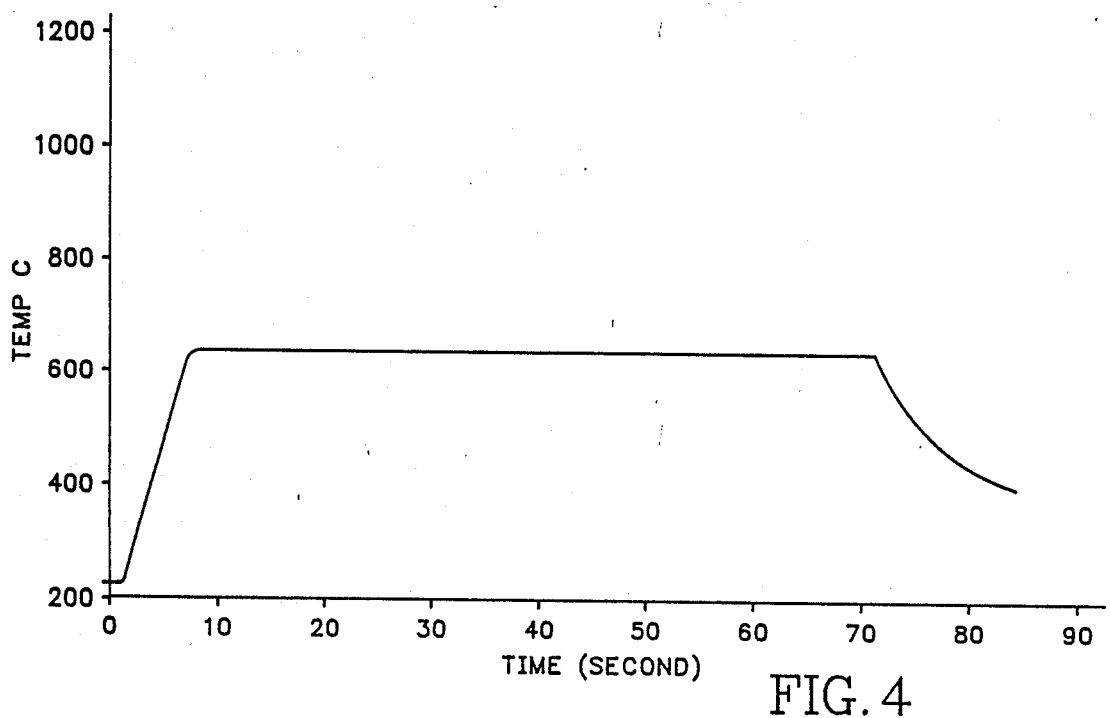
FIG. 4 is a chart showing a time versus temperature plot of a rapid thermal annealing step performed according to the invention.
FIG. 5 is a table showing test results obtained for various annealing times and temperatures of sample TFEL panels.

As FIG. 4 shows, the rate at which the thin films may be brought to a target temperature may exceed 50° C. per second. In the sample of FIG. 4 the films were brought from 240° C. to 640° C. in about 6 seconds. After maintaining the target temperature of 650° C. for about 60 seconds the sample was cooled at a rate of around 20° C. per second. These temperature measurements were made using a thermocouple in contact with the surface of the thin film layers. At these rates of heating and cooling, the glass substrate does not have enough time to warp. This provides a substantial advantage over conventionally annealed panels which are heated at a much slower rate or for longer time periods, thus allowing the substrate to experience thermal stress and warp, cracking the films.

FIG. 5 shows a number of samples of TFEL panels annealed according to the process of the invention. These are compared with a control sample panel annealed conventionally at 460° C. for one hour. As the chart shows for the standard SiON/ZnS:Mn/SiON process, the panels annealed at between 600° to 700° C. for 50 to 240 seconds are between 23% to 75% brighter than the control sample panel. These percentages are only slightly lower for the "high bright" process films which differ from the standard process films in that the ZnS:Mn layer is thicker and the SiON layers are thinner.

The phosphor utilized in all of the TFEL panels which were the subjects of the chart of FIG. 2 was zinc sulfide activated with manganese (ZnS:Mn) which is a yellow-emitting phosphor commonly used in such panels. FIG. 3 shows the results of the process on a different phosphor, which is an alkaline earth sulfide activated with a rare earth, in this case, $SrS:CeF_3$. This phosphor produces a blue color which is one of the most difficult colors to obtain from a TFEL panel. Curve A in FIG. 2 shows the luminance obtainable without thermal annealing of any type. The results shown in curve B, however, were attainable using the rapid thermal annealing process of the present invention. This chart shows that at much lower electrode voltages, much higher luminance was attainable. Lower electrode voltages are desirable because the panel consumes less power and operates more efficiently.

The process of the invention is suitable for other EL phosphors or electroluminescent materials. The use of high intensity radiant heat for a relatively short period of time provides the necessary conditioning of the EL material to promote grain size growth and repair lattice damage but does not warp the glass or damage the integrity of the thin-film laminate. Other TFEL phosphors that may be used include the following:

ZnS doped with Mn (ZnS:Mn) Yellow

ZnS doped with rare earth compounds (ZnS: RE, X), where RE is a rare earth such as Tb, Sm, Pr, Ce, Eu, Tm and X is a coactivator such as F, Cl, P. Examples include:

| | |
|---|---|
| $ZnS:TbF_3$ | Green |
| $ZnS:SmCl_3$ | Red |
| ZnS:SmP | Red |
| $ZnS:PrF_3$ | White |
| $ZnS:TmF_3$ | Blue |

SrS doped with rare earth compounds (SrS: RE, X) where RE is a rare earth such as Ce, Eu, Pr, Tb, Sm and X is a coactivator such as F, Cl, Br, P, Cu, K. Examples include:

| | |
|---|---|
| $SrS:CeF_3$ | Blue |
| SrS:Eu,F | Red |

CaS doped with rare earth compounds (CaS: RE, X) where RE is a rare earth element such as Eu, Ce, Tb, Sm, Pr and X is a coactivator such as F, Cl, Br, P, Cu, K. Examples include:

| | |
|---|---|
| CaS:Eu,F | Red |
| $CaS:CeF_3$ | Green |

When fabricating multiple layer or patterned phosphor multicolor TFEL panels, it is best to perform the annealing step on each phosphor layer or set of stripes as it is deposited, beginning with the phosphor requiring the highest temperature. In this way phosphor layers having lower temperature requirements are less likely to be damaged.

With some phosphor materials, notably those containing fluorine, an active gas is desirable for the rapid thermal annealing step. For example, if a phosphor with a fluorine coactivator such as $ZnS:TbF_3$ is used, fluorine gas may be inserted into the annealing chamber to modify the fluorine coactivator.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A rapid thermal annealing process for a thin-film electroluminescent panel, said panel having thin-film layers deposited on a glass substrate, said thin-film layers including a light emitting thin-film phosphor layer, comprising the steps of:
   (a) placing the thin-film electroluminescent panel on a support member, said support member having a high coefficient of energy absorption in the peak portion of the spectral energy range of a radiant heating element;
   (b) placing the panel on the support inside a radiant heating chamber utilizing said radiant heating element and uniformly radiantly heating the substrate and thin-film layers to a temperature which exceeds 500° C. at a rate that exceeds 20° per second;
   (c) maintaining the temperature achieved during step (b) for a time period of between 15 and 240 seconds; and
   (d) cooling the substrate and thin-film layers at a rate exceeding 10° C. per second.

2. The process of claim 1 further including the step of filling the interior o the heating chamber with an inert gas prior to heating the thin films.

3. The process of claim 1 wherein the light emitting thin film phosphor layer is ZnS:(RE,X) where RE is a rare earth and X is a coactivator from the group comprising fluorine, chlorine and phosphorous.

4. The process of claim 3 wherein the light emitting thin film phosphor layer contains a fluorine coactivator and an active gas containing fluorine is pumped into the heating chamber prior to heating the thin film layers.

5. The process of claim 1 wherein the light emitting thin film phosphor layer is composed of an alkaline earth sulfide activated with a rare earth.

6. The process of claim 1 wherein the temperature of step (b) lies in a range between 600° and 700° C.

7. The process of claim 1 wherein the time that the temperature is maintained in step (c) lies in a range from 60 to 180 seconds.

8. The process of claim 1 wherein the thin film layers include top and bottom insulator layers sandwiching the light emitting thin film phosphor layer.

9. The process of claim 8 further including the step of depositing a second light emitting phosphor layer on an insulating layer, said second light emitting phosphor layer having a color characteristic different from the light emitting thin film phosphor layer and repeating steps (a) through (c).

* * * * *

UNITED STATES PATENT AND TRADEMARK OFFICE
CERTIFICATE OF CORRECTION

PATENT NO.   : 4,900,584

DATED        : February 13, 1990

INVENTOR(S)  : Richard T. Tuenge and Richard E. Coovert

It is certified that error appears in the above-identified patent and that said Letters Patent is hereby corrected as shown below:

Column 1, line 54:  change "trough" to --through--.

Column 6, line 35:  change "500°C." to --550°C.--.

Column 6, line 41:  change "o" to --of--.

Signed and Sealed this

Twenty-eighth Day of January, 1992

Attest:

HARRY F. MANBECK, JR.

*Attesting Officer*     *Commissioner of Patents and Trademarks*